A. S. HUBBARD.
SYSTEM OF ELECTRICAL DISTRIBUTION.
APPLICATION FILED FEB. 19, 1906.
946,045.
Patented Jan. 11, 1910.
2 SHEETS—SHEET 2.
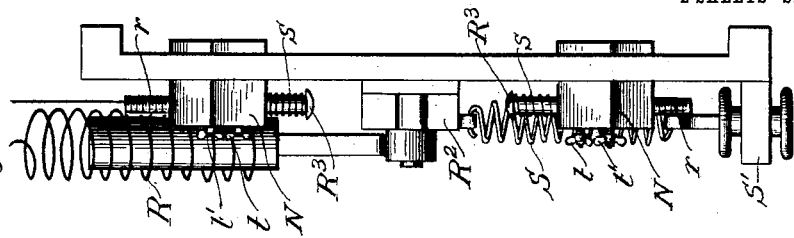
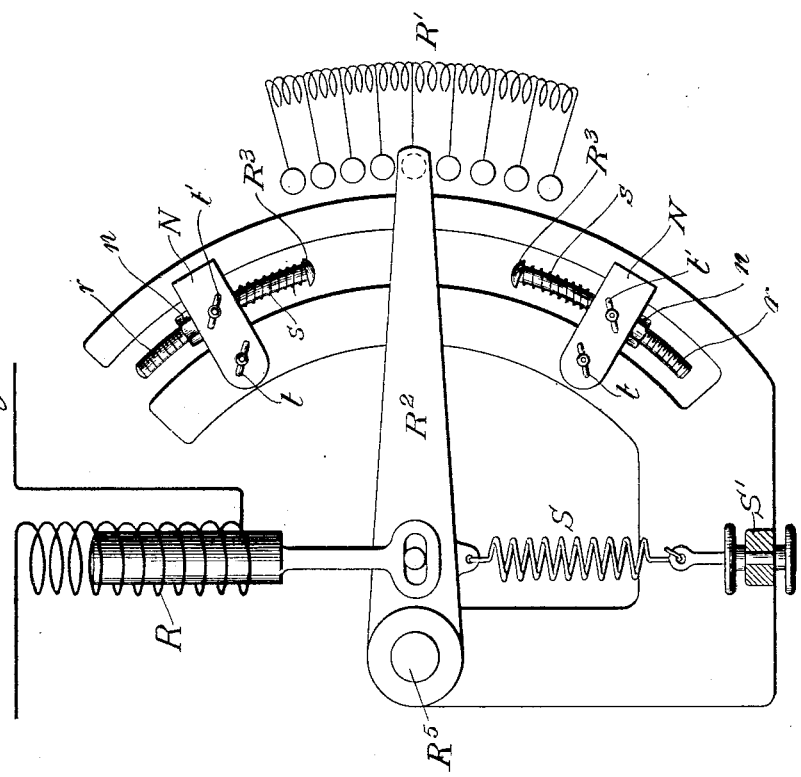

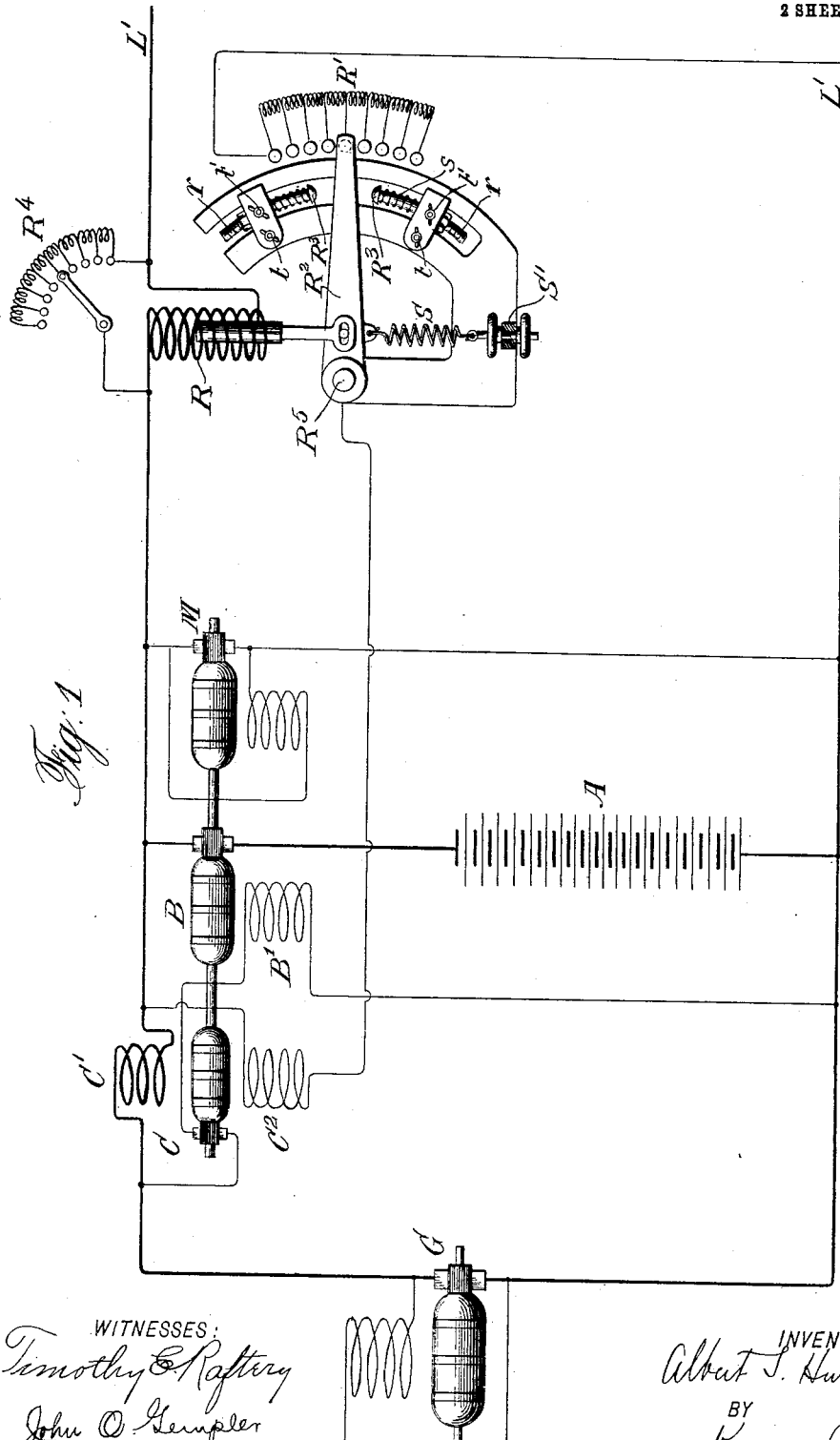

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

SYSTEM OF ELECTRICAL DISTRIBUTION.

946,045.  Specification of Letters Patent.  Patented Jan. 11, 1910.

Application filed February 19, 1906. Serial No. 301,723.

*To all whom it may concern:*

Be it known that I, ALBERT S. HUBBARD, a citizen of the United States, and a resident of Belleville, Essex county, State of New Jersey, have invented certain new and useful Improvements in Systems of Electrical Distribution, of which the following is a specification.

My invention relates generally to improvements in electrical systems of distribution in which a storage battery placed in parallel to the main generator or generators of the system (or of a sub-station) is employed for the purpose of regulating the load on the main generator. In systems of this character it has ordinarily been the object of the battery to maintain the load on the generator as nearly constant as practicable, and numerous forms of apparatus have been devised to effect this purpose as completely as possible, and as efficiently as possible, and with the greatest economy of apparatus and operation. In this class of system, however, so many special local conditions are frequently found, while questions of comparative economy of first cost of the installation and of its operation thereafter also arise, that it is not always advisable to regulate the battery with the greatest possible steadiness of generator load during the entire period of operation, and, therefore, I have found it desirable that at certain times, or under certain conditions, the generator should be permitted to take a substantial part of the fluctuations of load on the system. And I have also found it desirable, under some conditions, that the generator should take a substantial portion of some of the fluctuations of the system, while maintaining substantial constancy of current output when fluctuations of another type are present. In addition to this, it is also desirable that satisfactory means be provided for adjusting the average load that it is desired to fall upon the main generator, since it is frequently the case, that at some portions of the day the average load of the system will be considerably higher than at other portions of the day.

My invention has for its object to provide a system in which it is within the power of the operator, by simple adjusting mechanism, to change the average generator load without varying the proportion of changes of load that is permitted to fall upon the main generator, or to change the proportion of the fluctuations that are to fall upon the generator without changing the average generator load, or to permit a certain proportion of variations of the load to fall upon the generator during a part of the fluctuations and another proportion to fall upon the generator during another part of the fluctuations. For example, let us assume a specific system of this character in which the voltage of the system is maintained constant and the battery (with an average condition of charge) gives an open circuit voltage exactly equal to that of the system, there being a booster in series with the battery, which, under these conditions, should give no voltage when the load on the working circuit is to be identical with that on the generator, namely, when the generator has its average load and the battery is floating. Under these conditions it may be desirable to so adjust the mechanism as to change the amount of load corresponding to zero booster voltage without changing any other element of the system, the fluctuations being, so far as possible, entirely taken by the battery. Again, it may be desirable (as for example, if the battery chances to be smaller than it should be to obtain the best regulating results) to permit the generator to take a substantial percentage of the variations from average load and yet the average load should be definitely fixed at whatever value is desired, regardless of what share of the fluctuations the generator is to be permitted to take. Again, it may be desirable, regardless of what the average load desired may be, to permit the generator to take a substantial portion of the fluctuations during say, the time that the current on the system is high, while maintaining the generator load as steadily as possible during another period, say when the current on the system is low, this opportunity being availed of, perhaps, because the battery has become somewhat exhausted, and it is desirable that a net charge shall be given to it while permitting it to relieve the generator to some extent of the fluctuations on the system.

My invention therefore consists in the provision of means whereby these objects may be attained. These means, broadly, comprise apparatus acting upon the battery circuit, specifically the booster, in opposition to the primary regulating coil for the booster, said apparatus being affected by changes of load on the system, and it being adjustable, both as to its effect upon the booster (whereby the point of zero booster voltage may be fixed), and as to the effect that changes of load upon the system will have upon it (whereby its effect upon the booster voltage may have any desired relation to the fluctuations of load on the system) and also as to the range of action of the apparatus whereby a certain portion of the fluctuations may cause one effect upon the booster voltage, while the remaining portions of the fluctuations produce a different or no effect upon the booster voltage.

The specific apparatus that I have here shown and described and which constitutes my more specific invention comprises a coil responsive preferably to changes of current in the working circuit and acting upon a shunt circuit to vary the voltage thereof, such variations of voltage acting upon the regulating apparatus for the booster. The working circuit coil is opposed in its action by an adjustable force, such as a spring, while the relation between the current in the coil and the current of the system is determined by an adjustable resistance in shunt to the coil. The range of action of the coil is determined by a stop or stops which may be fixed at any point, or arranged so as to give an additional opposition to the movement caused by the coil.

I believe that I am the first to have by any apparatus attained all the various objects of my invention above set forth, and especially to have provided apparatus by which a system of this general character may be adjusted so that some predetermined portions of the fluctuations will be divided in a certain ratio between the battery and the generator, while other portions of the fluctuations will be divided in a different ratio. I do not, therefore, desire to be limited to the specific apparatus herein shown and hereinafter described, nor to the provision of apparatus that contains all of the functions I have set out, although I prefer, in order to get the greatest possible flexibility of adjustment to provide apparatus utilizing all these functions.

Referring to the drawings accompanying this specification, Figure 1 is a diagram illustrating my invention applied to one form of the general system to which I have referred. Figs. 2 and 3 are enlarged views of the specific form of adjusting apparatus employed.

G represents the main generator or generators of the system.

A represents a storage battery and B the armature of a booster in series therewith, the two constituting a branch across the circuit.

M represents a motor mechanically connected to the booster and preferably driving the same at constant speed.

L L' represent the conductors of the working circuit.

B' is the field winding of the booster which is in a branch circuit across the generator. The voltage of the booster is, in the present instance, regulated by the difference of potential resulting from the opposing electromotive forces of the main generator and armature C of a special dynamo, which armature is in series with the booster field in its branch circuit and is mechanically connected with the armature B and the armature of the motor.

C' is a field winding for the counter machine and is located in the circuit between the generator and the battery branch so as to be subject to variations of current in that circuit.

$C^2$ is a coil connected in a branch circuit, as indicated, and is, in the present instance, connected and wound so that its effect upon the armature C is opposite to that of the effect of the coil C'. If the voltage across the coil $C^2$ were maintained constant the voltage of C would vary in direct accordance with the current flowing through the coil C' in the generator circuit. Under these conditions the load on the main generator can be maintained substantially constant. Thus to assume a usual condition, the apparatus could be designed so that with a given current in the coil C' corresponding to the average current desired on the generator, the combined effect of C' and $C^2$ would be just sufficient to produce a voltage in the armature C equal to the opposing voltage of the generator. Under these conditions there would be no current in the booster field B' and no voltage generated by the booster armature B, while the battery has an open circuit voltage equal to that of the generator so that it would simply be floating across the line without either charging or discharging. Any change that would tend to throw more or less current on the generator would cause a voltage in one direction or another to be generated by the armature C and therefore a current in one direction or another through the booster field winding, thus causing the booster to give a voltage to charge or discharge the battery according as the load on the main generator falls or rises. The change in the coil C' need not be great because the effect of the counter machine is to increase the effect of changes in the coil in their effect upon the booster voltage. Moreover, the change on the generator G may be made substantially negligible under these circumstances because I have connected the counter machine and motor, as set out in an earlier application of mine, in such a way that changes in the coil C' may be to a greater or lesser extent, or even entirely, offset by the current generated or consumed by the armature C.

I have described so far simply one type of the class of systems to which my invention is applicable. I desire it to be understood that I have simply chosen a preferred form of system, as illustrative, it being possible to apply my invention to any system wherein there is a branch regulating battery, the action of which is automatically regulated for the purpose of steadying the load on the main generator or the voltage of the system. In this specific system I attain the objects of my invention by an apparatus designed to adjust the voltage and the variations of voltage occurring across the coil $C^2$. It is obvious that if the voltage across the coil $C^2$ be varied, the regulating effects of the armature C will be likewise varied. If the system be adjusted so as to change the voltage across $C^2$ from one fixed voltage to another fixed voltage then the average current on the generator, or the current that would produce a zero booster voltage, would be changed, but the generator would take neither a greater nor less proportion of the fluctuations of the system than before. It is also clear that if the voltage across this coil $C^2$ increases as the load on the system increases, then the effect of such changes of voltage would be to increase the percentage of the fluctuations falling upon the main generator. It is also clear that if this voltage across $C^2$ fluctuates with a portion of the fluctuations of the load on the system, but does not fluctuate, or fluctuates less with other portions thereof, then the generator will take different proportions of the load under different conditions of load on the system. I have, therefore, provided an apparatus which may be made to perform all or any of these different effects upon the voltage across the coil $C^2$. It is not essential that this apparatus should act upon the particular field winding or, indeed, upon any specific circuit, so long as it produces the corresponding effects upon the booster voltage.

At R, I have shown a coil which I prefer to place in the working circuit because at this point it is more directly responsive to changes of current in the working circuit and more efficiently exerts its energy. It is only essential, however, that it should be effected by changes of load on the system. At $R^4$, I have shown an adjustable resistance shunting this coil R. By means of this adjustable resistance I can cause any proportion of the working circuit to traverse the coil R that I desire, or I may short circuit the coil completely.

$R^2$ is a lever pivoted at $R^5$ and electrically connected at one end with a terminal of the coil $C^2$, and at the other end with a series of resistances R' through which it is connected to one side of the system. The coil $C^2$ is, therefore, in a branch circuit containing the arm $R^2$ and more or less of the resistances R'. The magnetism produced by the current in the coil R attracts the lever $R^2$ tending to cut the resistances R' out of circuit. The spring S connected to the arm $R^2$ and having a mechanism S' for adjusting the strength of the spring, acts upon the arm in a direction opposite to that of the coil R and therefore tending to introduce resistance into the circuit of the coil $C^2$.

$R^3$, $R^3$, represent stops carried on rods $r$, which pass through openings in adjustable supports N. These rods are movable in their supports, being pressed forward by the springs $s$ engaging the stops and their supports. The strength of these springs $s$ may be adjusted by the nuts $n$ engaging the threaded ends of the rods. The supports N may be moved to any position and there fastened by means of the set screws $t$. If it is desired that the stops, or either of them, shall be fixed in their position, this is accomplished by operating the set screws $t'$. By this arrangement the lever arm $R^2$ may be made free to move throughout the range of the resistance R' according to the fluctuations of the current in the coil R or either or both of the stops $R^3$ may be employed to limit the movement of the arm $R^2$ or to offer an additional measured resistance to the movement of that arm.

Suppose first that it is desired that the generator load shall be kept at the greatest possible constancy at all times. Under these conditions the adjustable resistance $R^4$ is entirely cut out of the circuit around R, so that the coil R is short circuited and exerts no power upon the arm $R^2$. Then it is only necessary to manually move the arm $R^2$ to such a point with reference to resistances R' that the voltage across $C^2$ will be sufficient to cause a zero booster voltage at whatever may be the desired average load on the generator G. When this is done, if the lower stop be moved and rigidly held by the thumb screws $t$ $t'$ to hold the arm $R^2$ at this position, the system is definitely adjusted with this condition of operation. Suppose now, that it is desired, without changing the desired average load, to permit the generator to vary its load with that of the system to a greater extent than before. Under these circumstances the adjustable resistance $R^4$ is adjusted so that a definite proportion of the current passes through the coil R. The spring S is then adjusted by the mechanism S' so that with the desired average current passing through R and $R^4$, the opposing forces of the spring and the current in coil R will bring the lever $R^2$ to the same position as before. The lower stop R³ can then be slid back to the bottom of the rheostat. The greater the resistance of R⁴ the greater the proportion of current in the coil R and, therefore, the greater will be the percentage of the fluctuations falling upon the main generator, the current in coil R thus acting to decrease the booster voltage and, therefore, the battery current, so increasing the generator current. Suppose now, it is desired that during a portion of the time, say when the load is high, it is desired that the generator take a substantial percentage of the fluctuations, while at another portion of the period, say, when the load on the system is below the average, it is desired that the generator regulate as closely as possible. It is then only necessary to adjust the system as before, and move the lower stop so that it will engage the arm when it falls to a point representing the average load upon the system. If the stop be fixed at that point the adjusting apparatus will not be responsive to fluctuations of loads on the system that are lower than the average current thereof.

By the arrangement of stops with their adjustable springs shown, it is clear that it is possible to have the apparatus so that when the fluctuations are extremely high the generator will feel one percentage thereof, when the fluctuations are only moderately high, or only moderately low, the generator will feel another percentage thereof, and, when the fluctuations are extremely low, the generator will feel still another percentage thereof.

In practice it is probable that only the lower stop would, in most cases, be employed and it would not be necessary to apply the adjustable spring to that stop, because the conditions for which my apparatus would most frequently be applicable are such as would require that a fair proportion of the load be thrown on the generator when there is an increase of load on the system, whereas it would not be necessary to vary the load of the generator substantially when there is a decrease of load on the system below the average.

What I claim as new and desire to secure by Letters Patent is,—

1. A main generator, an auxiliary battery circuit, and two regulating means for automatically affecting the battery current, said means being affected by current changes of the system and arranged to oppositely affect the battery current for similar changes of current on the system.

2. A main generator, an auxiliary battery circuit, and two regulating means for automatically affecting the battery current, said means being affected by current changes of the system and arranged to oppositely affect the battery current for similar changes of current on the system, and means for varying the regulating action of one of the regulating means.

3. A main generator, an auxiliary battery circuit, and two regulating means for automatically affecting the battery current, said means being affected by current changes of the system and arranged to oppositely affect the battery current for similar changes of current on the system and means for varying the effect upon one of said regulating means of current changes of the system.

4. A main generator, an auxiliary battery circuit, and two regulating means for automatically affecting the battery current, said means being affected by current changes of the system and arranged to oppositely affect the battery current for similar changes of current on the system and means for adjusting the range of action of one of said regulating means.

5. A main generator, an auxiliary battery circuit, and two regulating means for automatically affecting the battery current, said means being affected by current changes of the system and arranged to oppositely affect the battery current for similar changes of current on the system and means for adjusting one of said regulating means to have a different degree of regulating effect at different portions of the load fluctuations of the system.

6. A main generator, an auxiliary battery circuit and two regulating coils and mechanisms actuated thereby for automatically affecting the battery current, said coils being affected by similar current changes of the system to produce opposite effects upon the battery current.

7. A main generator, an auxiliary battery circuit, two regulating coils and mechanisms actuated thereby for automatically affecting the battery current, said coils being affected by similar current changes of the system to produce opposite effects upon the battery current and adjustable means for opposing the action of one of said coils.

8. A main generator, an auxiliary battery circuit, two regulating coils and mechanisms actuated thereby for automatically affecting the battery current, said coils being affected by similar current changes of the system to produce opposite effects upon the battery current and an adjustable shunt for one of said coils.

9. A main generator, an auxiliary battery circuit, two regulating coils and mechanisms actuated thereby for automatically affecting the battery current, said coils being affected by similar current changes of the system to produce opposite effects upon the battery current and an adjustable stop on one of said mechanisms to limit its range of action.

10. A main generator, an auxiliary battery circuit, two regulating coils and mechanisms actuated thereby for automatically affecting the battery current, said coils being affected by similar current changes of the system to produce opposite effects upon the battery current, adjustable means for opposing the action of one of said coils, and an adjustable shunt for the same coil.

11. A main generator, an auxiliary battery circuit, two regulating coils and mechanisms actuated thereby for automatically affecting the battery current, said coils being affected by similar current changes of the system to produce opposite effects upon the battery current, adjustable means for opposing the action of one of said coils, and an adjustable stop on the said mechanism for the same coil to limit its range of action.

12. A main generator, an auxiliary battery circuit, two regulating coils and mechanisms actuated thereby for automatically affecting the battery current, said coils being affected by similar current changes of the system to produce opposite effects upon the battery current, an adjustable shunt for one of said coils, and an adjustable stop on the said mechanism for the same coil to limit its range of action.

13. A main generator, an auxiliary battery circuit, two regulating coils and mechanisms actuated thereby for automatically affecting the battery current, said coils being affected by similar current changes of the system to produce opposite effects upon the battery current, adjustable means for opposing the action of one of said coils, an adjustable shunt for the same coil, and an adjustable stop on the said mechanism for the same coil to limit its range of action.

14. A main generator, an auxiliary battery circuit, a booster therein, two regulating devices therefor each affected by changes of current of the system, and an adjustable mechanism opposing the action of one of said devices.

15. A main generator, an auxiliary battery circuit, a booster therein, two regulating devices therefor each affected by changes of current of the system and means for limiting the range of the action of one of said devices.

16. A main generator, an auxiliary battery circuit, a booster therein, two regulating devices therefor each affected by changes of current of the system, an adjustable mechanism opposing the action of one of said devices, and means for limiting the range of action of the said device.

17. A main generator, an auxiliary battery circuit, a booster therein, means for automatically regulating the booster to steady the load on the main generator, and means for introducing a secondary automatic regulation of the booster at desired portions of the load fluctuations of the system.

18. A main generator, an auxiliary battery circuit, a booster therein, two opposing means for automatically regulating the booster voltage, and means for limiting the range of action of one of said opposing means.

19. A main generator, an auxiliary battery circuit, a regulating coil for said battery circuit responsive to fluctuations of the current on the generator, and a coil responsive to fluctuations in the working circuit and acting oppositely upon the battery circuit.

20. A main generator, an auxiliary battery circuit, a regulating coil for said battery circuit responsive to fluctuations of the current on the generator, a coil responsive to fluctuations in the working circuit and acting oppositely upon the battery circuit, and means for adjusting the action of the latter coil.

21. A main generator, an auxiliary battery circuit, a booster therein, a regulating coil therefor responsive to fluctuations of current on the generator and a second regulating coil therefor acting oppositely thereon and responsive to fluctuations of current in the working circuit.

22. A main generator, an auxiliary battery circuit, a booster therein, a regulating coil therefor responsive to fluctuations of current on the generator, a second regulating coil therefor acting oppositely thereon and responsive to fluctuations of current in the working circuit, and means for adjusting the action of said second coil.

23. In an electric system of distribution having a main generator, a battery circuit in parallel thereto, and means for regulating the battery action to steady the load on the main generator, a coil responsive to fluctuations of current in the working circuit and arranged to decrease the voltage of the battery circuit upon increase of current in the working circuit.

24. In an electric system of distribution, a main generator, a battery circuit in parallel thereto, means for increasing the voltage of the battery circuit in accordance with increase of current from the main generator, and opposing means tending to decrease the voltage of the battery circuit as the current in the working circuit increases.

25. In an electric system of distribution having a main generator and a battery circuit in parallel thereto feeding a working circuit, the battery circuit being regulated to steady the load on the main generator, a coil responsive to fluctuations of current of the working circuit and acting to increase the fluctuations of current on the main generator.

26. In an electric system of distribution having a main generator and a battery circuit in parallel thereto feeding a working circuit, the battery circuit being regulated to steady the load on the main generator, a coil responsive to fluctuations of current of the working circuit and acting to increase the fluctuations of current on the main generator, and means for varying the relation between the working circuit current and the current in said coil.

27. In an electric system of distribution having a main generator and a battery circuit in parallel thereto feeding a working circuit, the battery circuit being regulated to steady the load on the main generator, a coil responsive to fluctuations of current of the working circuit and acting to increase the fluctuations of current on the main generator, and means for varying the action of said coil upon the current of the main generator.

28. In an electric system of distribution having a main generator and a battery circuit in parallel thereto feeding a working circuit, the battery circuit being regulated to steady the load on the main generator, a coil responsive to fluctuations of current of the working circuit and acting to increase the fluctuations of current on the main generator, means for varying the relation between the working circuit current and the current in said coil, and means for varying the action of said coil upon the current of the main generator.

29. In an electric system of distribution having a main generator and a battery circuit in parallel thereto feeding a working circuit, the battery circuit being regulated to steady the load on the main generator, a coil responsive to fluctuations of current of the working circuit and acting to increase the fluctuations of current on the main generator, and means for preventing given portions of the working circuit fluctuations from producing an action by said coil.

30. In an electric system of distribution having a main generator and a battery circuit in parallel thereto feeding a working circuit, the battery circuit being regulated to steady the load on the main generator, a coil responsive to fluctuations of current of the working circuit and acting to increase the fluctuations of current on the main generator, and means for varying the relation between the working circuit current and the current in said coil and for preventing given portions of the working circuit fluctuations from producing an action by said coil.

31. In an electric system of distribution having a main generator and a battery circuit in parallel thereto feeding a working circuit, the battery circuit being regulated to steady the load on the main generator, a coil responsive to fluctuations of current of the working circuit and acting to increase the fluctuations of current on the main generator, and means for varying the action of said coil upon the current of the main generator and for preventing given portions of the working circuit fluctuations from producing an action by said coil.

32. In an electric system of distribution having a main generator and a battery circuit in parallel thereto feeding a working circuit, the battery circuit being regulated to steady the load on the main generator, a coil responsive to fluctuations of current of the working circuit and acting to increase the fluctuations of current on the main generator, means for varying the relation between the working circuit current and the current in said coil, means for varying the action of said coil upon the current of the main generator, and means for preventing given portions of the working circuit fluctuations from producing an action by said coil.

33. In an electric system of distribution having a main generator and a battery circuit in parallel thereto feeding a working circuit, a booster in the battery circuit, a regulating coil responsive to changes of generator current acting upon the booster to produce a voltage therein in one direction, and a coil responsive to fluctuations of current of the working circuit acting oppositely upon the booster voltage.

34. In an electric system of distribution having a main generator and a battery circuit in parallel thereto feeding a working circuit, a booster in the battery circuit, a regulating coil affected by changes of current on the system acting upon the booster to produce a voltage therein in one direction, a coil affected by similar changes of current of the system to act oppositely upon the booster voltage, and means for varying the effect upon the latter coil of changes of current in the system.

35. In an electric system of distribution having a main generator and a battery circuit in parallel thereto feeding a working circuit a booster in the battery circuit, a regulating coil affected by changes of current on the system acting upon the booster to produce a voltage therein in one direction, a second regulating coil affected by similar changes of current of the system to act oppositely upon the booster voltage, and means for varying the action of the latter coil upon the booster voltage.

36. In an electric system of distribution having a main generator and a battery circuit in parallel thereto feeding a working circuit, a booster in the battery circuit, a regulating coil affected by changes of current on the system acting upon the booster to produce a voltage therein in one direction, a coil affected by similar changes of current of the system to act oppositely upon the booster voltage, and means for varying the relation between the working circuit current and the current in said coil, and means for varying the action of the latter coil upon the booster voltage.

37. In an electric system of distribution having a main generator and a battery circuit in parallel thereto feeding a working circuit, a booster in the battery circuit, a regulating coil affected by changes of current of the system acting upon the booster to produce a voltage therein in one direction, a coil affected by similar changes of current of the system to act oppositely upon the booster voltage, and means for preventing given portions of the current changes of the system from producing an action by the latter coil.

38. In an electric system of distribution having a main generator and a battery circuit in parallel thereto feeding a working circuit, a booster in the battery circuit, a regulating coil affected by changes of current of the system acting upon the booster to produce a voltage therein in one direction, a coil affected by similar changes of current of the system to act oppositely upon the booster voltage, means for varying the relation between the current of the system and the current in said coil and for preventing given portions of the current changes of the system from producing an action by said coil.

39. In an electric system of distribution having a main generator and a battery circuit in parallel thereto feeding a working circuit, a booster in the battery circuit, a regulating coil affected by changes of current of the system acting upon the booster to produce a voltage therein in one direction, a coil affected by similar changes of current of the system to act oppositely upon the booster voltage, means for varying the action of the latter coil upon the booster voltage, and means for preventing given changes of current of the system from producing an action by said coil.

40. In an electric system of distribution having a main generator and a battery circuit in parallel thereto feeding a working circuit, a booster in the battery circuit, a regulating coil affected by changes of current of the system acting upon the booster to produce a voltage therein in one direction, and a coil affected by similar changes of current of the system to act oppositely upon the booster voltage, and means for varying the relation between the current of the system and the current in the latter coil, means for varying the action of said coil upon the booster voltage, and means for preventing given portions of the changes of current of the system from producing an action by said coil.

41. A main generator, an auxiliary battery circuit, a booster therein, a primary regulating coil therefor affected by current changes of the system, a coil in a branch circuit arranged to also affect the booster voltage, and an adjustable mechanism automatically varying the current in said coil with given changes of current of the system.

42. A main generator, an auxiliary battery circuit, a booster therein, a primary regulating coil therefor affected by current changes of the system, a coil in a branch circuit arranged to also affect the booster voltage, a resistance in series with the latter coil, and means for varying the said resistance with given changes of current of the system.

43. A main generator, an auxiliary battery circuit, a booster therein, a primary regulating coil therefor affected by current changes of the system, a coil in a branch circuit arranged to also affect the booster voltage, a rheostat for governing the current in the latter coil, and a regulating coil for said rheostat responsive to given current changes of the system.

44. A main generator, an auxiliary battery circuit, a booster therein, a primary regulating coil therefor affected by current changes of the system, a coil in a branch circuit arranged to also affect the booster voltage, a rheostat for governing the current in the latter coil, a regulating coil for said rheostat, and means for supplying current thereto in any desired ratio to the current of the system.

45. A main generator, an auxiliary battery circuit, a booster therein, a primary regulating coil therefor affected by current changes of the system, a coil in a branch circuit arranged to also affect the booster voltage, a rheostat for governing the current in the latter coil, a regulating coil for said rheostat, and an adjustable mechanism opposing the action of the latter regulating coil.

46. A main generator, an auxiliary battery circuit, a booster therein, a primary regulating coil therefor affected by current changes of the system, a coil in a branch circuit arranged to also affect the booster voltage, a rheostat for governing the current in the latter coil, a regulating coil for said rheostat, and means for limiting the range of action of said rheostat.

47. A main generator, a battery, a booster in the battery circuit, a working circuit, means for regulating the booster to maintain substantial constancy of the generator load, means responsive to changes of working circuit load above a definite point for lessening the regulating action of the booster, and means for adjusting said reducing means for a fixed reduction or for one varying with the fluctuations above said definite point.

48. A main generator, a battery, a booster in the battery circuit, a working circuit, means for regulating the booster to maintain substantial constancy of the generator load, means responsive to changes of working circuit load below a definite point for lessening the regulating action of the booster, and means for adjusting said reducing means for a fixed reduction or for one varying with the fluctuations above said definite point.

49. An electric circuit, a regulating device comprising a rheostat, a controlling coil therefor, a tension device opposing said coil, and a device arranged to also automatically act upon said rheostat to modify its movement when the current in said circuit has reached a predetermined value.

50. A regulating device comprising a rheostat, automatic means for controlling the movement of the same, and adjustable means acting upon the device to produce desired inequalities of action of said rheostat at different parts of its range.

51. A rheostat, a regulating coil therefor, an opposing tension device, and an additional opposing means arranged to act upon the rheostat only when certain portions of it are in operation.

52. In an electrical system of distribution, the combination of an electric circuit and its load, a generator and a storage battery operatively arranged with respect to the circuit, apparatus for controlling the division of load between the generator and the battery and means for checking the operation of the controlling apparatus during certain variations of said load.

53. In an electrical system of distribution, an electric circuit, a storage apparatus operatively connected thereto, a device for controlling the action of said apparatus responsive to variations in the electrical condition of the system, a coil for varying the action of said device and a device for checking said controlling action also responsive to certain variations in the electrical condition of the system and varying the action of said coil.

54. In an electrical system of distribution, an electric circuit and its load, a storage battery connected thereto, a booster in operative relation therewith, an exciter for controlling the action of said booster responsive to load variations, and a device for checking the action of said exciter responsive to certain variations in the electrical condition of the system.

55. In combination, an electric circuit and its source, a storage battery operatively arranged to deliver and receive energy to and from the circuit, electroresponsive means for controlling the charge and discharge of the battery, other automatic means adapted to counteract the effects of the first and a device for permitting said automatic means to operate in only one direction when the output from the source is on one side of a certain value.

56. In combination, an electric circuit and its source, a storage battery in operative relation thereto, electro-responsive devices for controlling the division of load between said battery and said source, and independent means for varying the action of said first mentioned means responsive to variations in the electrical condition of the system, said last mentioned means being arranged to counteract the action of the first mentioned means.

57. In combination, an electric circuit and its source, a storage battery in operative relation therewith, a booster for controlling the charge and discharge of the battery, means varying the booster action responsive to variations in the electrical condition of the system and means arranged to counteract the first mentioned means responsive to changes in the electrical condition of the system.

In testimony whereof, I have signed my name to this specification, in the presence of two subscribing witnesses.

ALBERT S. HUBBARD.

Witnesses:
RICHARD EYRE,
EDWIN SEGER.